United States Patent

[11] 3,629,511

[72] Inventor Richard B. Wolf
Evanston, Ill.

[21] Appl. No. 847,545
[22] Filed Aug. 5, 1969
[45] Patented Dec. 21, 1971
[73] Assignee Bell Telephone Laboratories, Incorporated
Murray Hill, N.J.

[54] PBX TELEPHONE SYSTEM WITH MAIN AND SATELLITE SWITCH UNITS
10 Claims, 11 Drawing Figs.

[52] U.S. Cl. .......... 179/18 AD
[51] Int. Cl. .......... H04q 3/58
[50] Field of Search .......... 179/27 CA, 18 AD

[56] References Cited

UNITED STATES PATENTS 3,426,158 2/1969 Browne et al. .......... 179/27 CA

*Primary Examiner*—William C. Cooper
*Attorneys*—R. J. Guenther and James Warren Falk

ABSTRACT: A switching and control arrangement for a private branch exchange (PBX) system is described in which a plurality of satellite switch units, each terminating a distinct plurality of lines, are served by a common control unit at a remote central office. Only one of the switch units has attendant facilities, and the switch units may be directly interconnected to serve calling and called stations located in different switch units.

INVENTOR
R. B. WOLF
BY
R. C. Winter
ATTORNEY

PBX TELEPHONE SYSTEM WITH MAIN AND SATELLITE SWITCH UNITS

BACKGROUND OF THE INVENTION

Private branch exchange systems, hereinafter termed PBX's, are telephone switching systems which are designed to serve a relatively few extension stations assigned to a single customer. Originally, these stations required operator assistance for connections to or from central office facilities. The PBX extensions were considered as part of the PBX and not as part of the general telephone network; the operator being the interface with the outside world.

Traditionally PBX's have had the entire exchange equipment, including both control circuitry and switching network, located on the customer's premises. An early development was to allow PBX extensions to dial foreign exchange calls directly but with toll restrictions imposed so that no calls could be dialed directly by an extension if toll charges were to be assessed. Such calls still were placed through the operator.

More recent PBX installations cooperate with the associated central office facilities to provide for both unlimited outward dialing by extensions and direct inward access to an extension from the general network, thus bypassing the operator. For both of these services there must exist a much closer relationship between the central office and the PBX on the customer's premises than had priorly been the case. Several recently developed PBX systems provide these features, one of which utilizes recently developed electronic techniques, including techniques for the stored program control of telephone systems. This latter system is disclosed, inter alia, in R. C. Gebhardt et al. U.S. Pat. No. 3,225,144, issued Dec. 21, 1965, and F. S. Vigliante et al. U.S. Pat. No. 3,268,669, issued Aug. 23, 1966. In this system the relationship between the PBX and the central office, through which it is reached by the outside world, is more intimate in that the system comprises switch units, which are at the customer's premises, and a control unit which, unlike prior systems, is not at the customer's premises. Accordingly, the central office can readily obtain the information necessary to provide the improved in and out dialing services discussed above, as well as other special service features including tie trunks, conferencing arrangements, etc.

The control unit is described in detail in the aforementioned Vigliante et al. patent and the switch units in the Gebhardt et al. patent. As therein set forth the system comprises a plurality of independent switch units, each serving a distinct group of stations. A scanning arrangement detects changes in supervisory states of the station lines. A time division switching network directs intelligence signals between stations, and the control unit, common to all of the switch units, responds to a request for service from one of the PBX stations by transmitting control signals to the switch unit for directing connection of the calling station to the called station through the switching network.

In such a system a switch unit may serve a group of stations assigned to a single PBX customer, and a single control unit serves a number of switch units. Each switch unit is restricted to serving a maximum number of stations, the upper limit being dictated by the nature of the internal time division operation and not by control unit parameters. The control unit utilizing electronic components can tolerate many times the amount of traffic which a single switch unit can provide. Thus a particular advantage of this system arrangement resides in the ability of the common control unit to accommodate a large number of individual switch units.

A problem is encountered in such systems when a PBX customer's service requirements grow beyond the capacity of a single switch unit. The addition of an independent switch unit to the customer's facilities, considering the separate services it provides, presents an inefficient and uneconomical solution to this expansion problem. Such an addition also requires that stations terminating on one switch unit be interconnected with stations terminating on another switch unit via the remote common control unit, albeit both switch units are on the same customer's premises. A graphic example of this inefficiency would be presented by PBX stations located in adjacent rooms but terminating on different switch units. In this instance the calling station would be required to dial extra digits, as if for a foreign exchange call, in order to complete a connection between them, which connection then would occupy tie-trunks between the remote control unit and each of the switch units, an obviously inefficient employment of trunks and control facilities.

SUMMARY OF THE INVENTION

A satellite switch unit configuration is provided in which only one of a plurality of switch units contains attendant facilities and in which a unified numbering plan permits any station in the satellite complex to be reached from any other station in the complex by dialing the same number of digits. The key to this solution is the provision of tie-trunks directly between switch units with the remote control unit arranged so as to permit connections to be established and maintained via the tie-trunks which are completely independent of the control unit.

This solution requires the dedication of a portion of the control unit memory to storage of information generated by call processing routines during the scan of an independent switch unit. Thus in the course of such a scan, a request for service may be detected which requires that some action be taken in a second switch unit. In this instance a message will be generated and stored in that portion of the control unit memory dedicated to the second switch unit, after which the program advances to the processing of the next call connection. Later in the office cycle, the second switch unit will be scanned, at which time the memory is examined to see if any messages concerning the second switch unit are contained therein. The request for service from the first switch unit will be encountered, and the desired action in the second switch unit now may be taken.

Interaction between control unit and satellite switch units for this purpose is via data and digit trunks as described in the aforementioned Vigliante et al. patent. The point of departure is in the provision of instructions via the data trunks to the second switch unit, terminating the called station, to permit this switch unit to complete a connection via a tie-trunk to the first switch unit, terminating the calling station. The tie-trunk itself is terminated solely on the switch units which it interconnects.

Advantageously, this concept may be extended to permit this type of interswitch unit service without requiring tie-trunks between each pair of switch units. For this purpose the message normally directed to the second switch unit to complete a tie-trunk connection to the first switch unit may now be directed to a third switch unit which terminates tie-trunks to both first and second switch units, thus permitting completion of a connection between them in tandem fashion. Further advantages are evident in conference and attendant connections.

DRAWING

Figure 1:
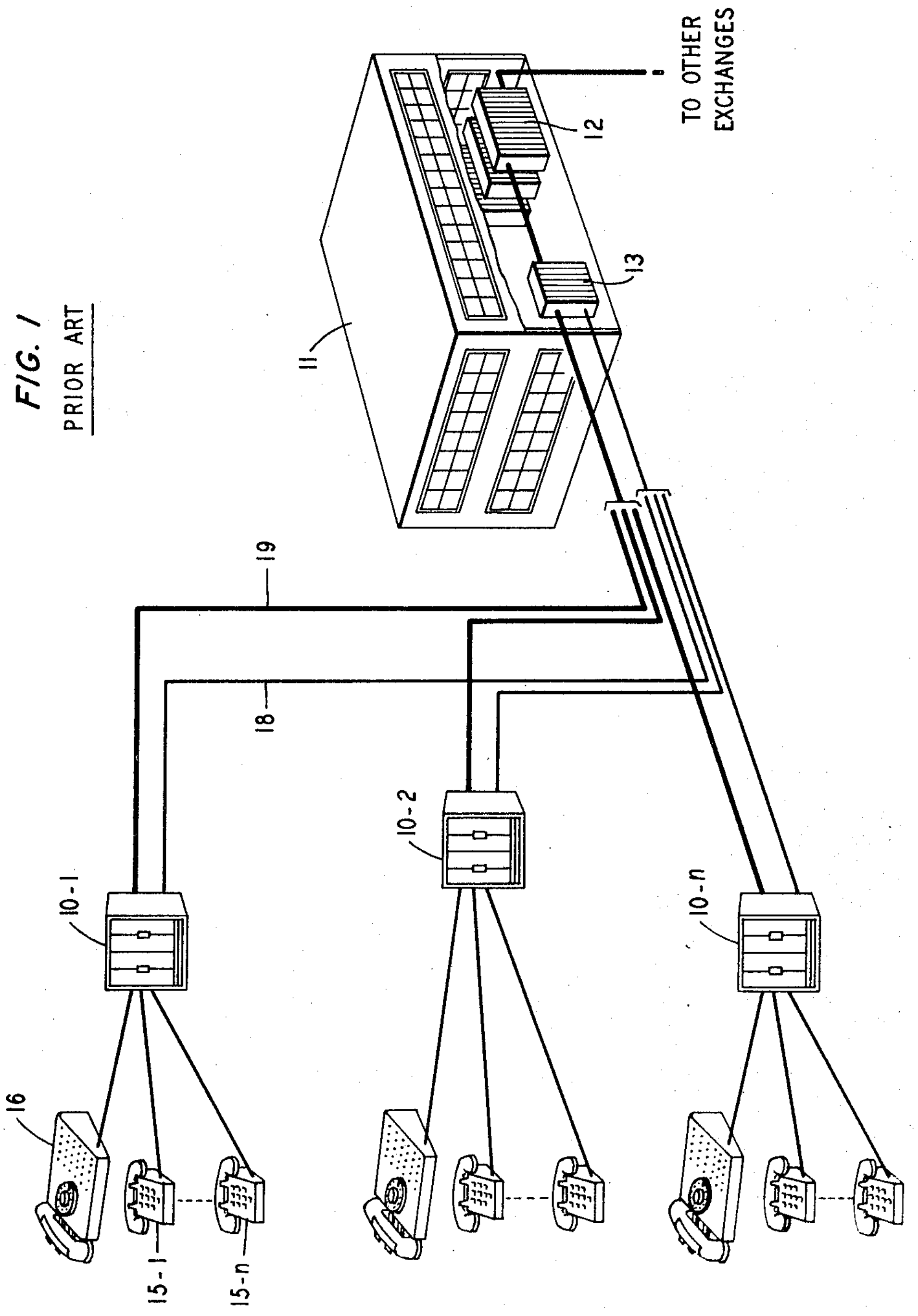
FIG. 1 PRIOR ART
FIG. 1 is a block diagram representation of a private branch exchange (PBX) communication system in which this invention may be incorporated.
Figure 2:
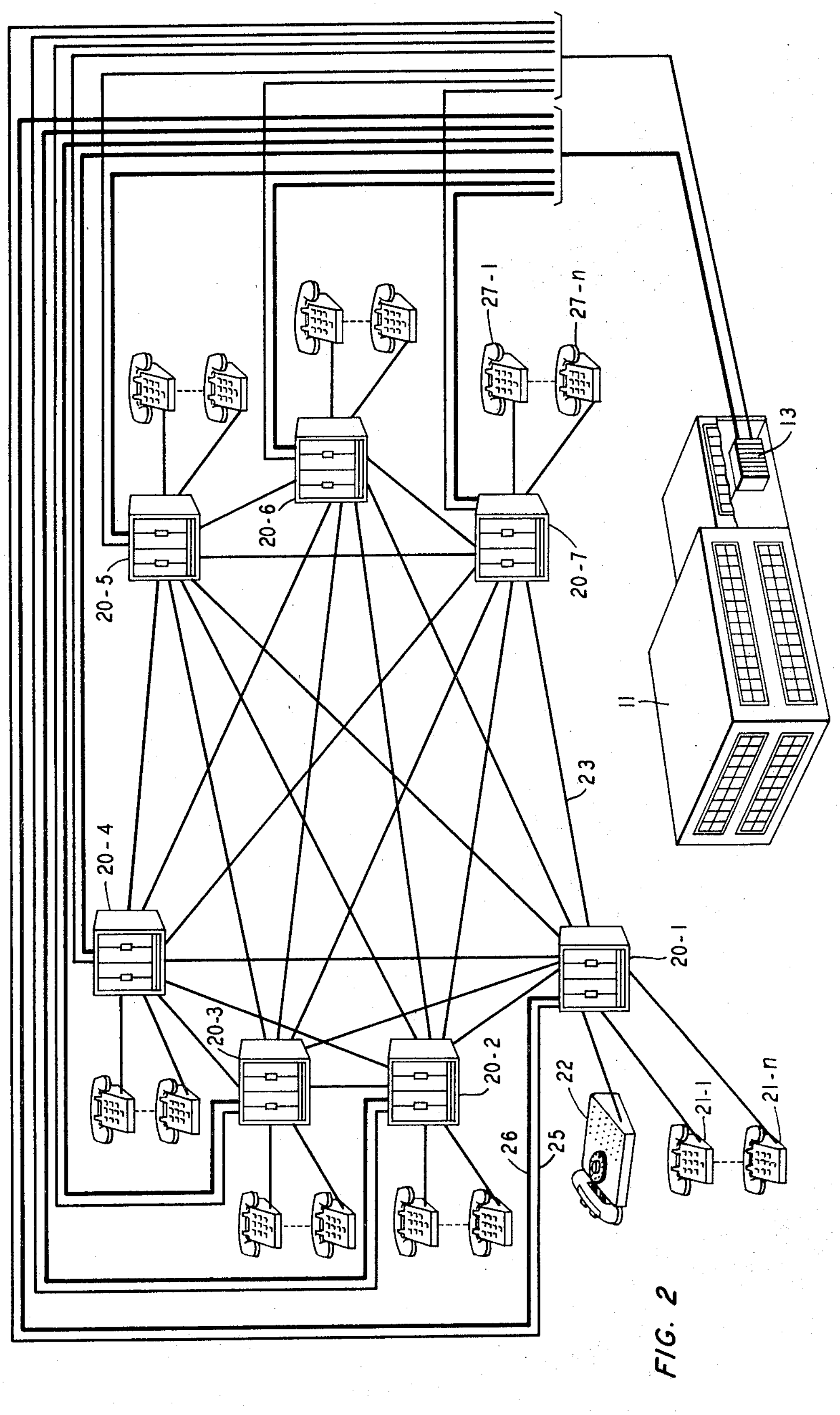
FIG. 2 is a typical arrangement of switch units in a main satellite configuration in accordance with this invention.
Figure 3:
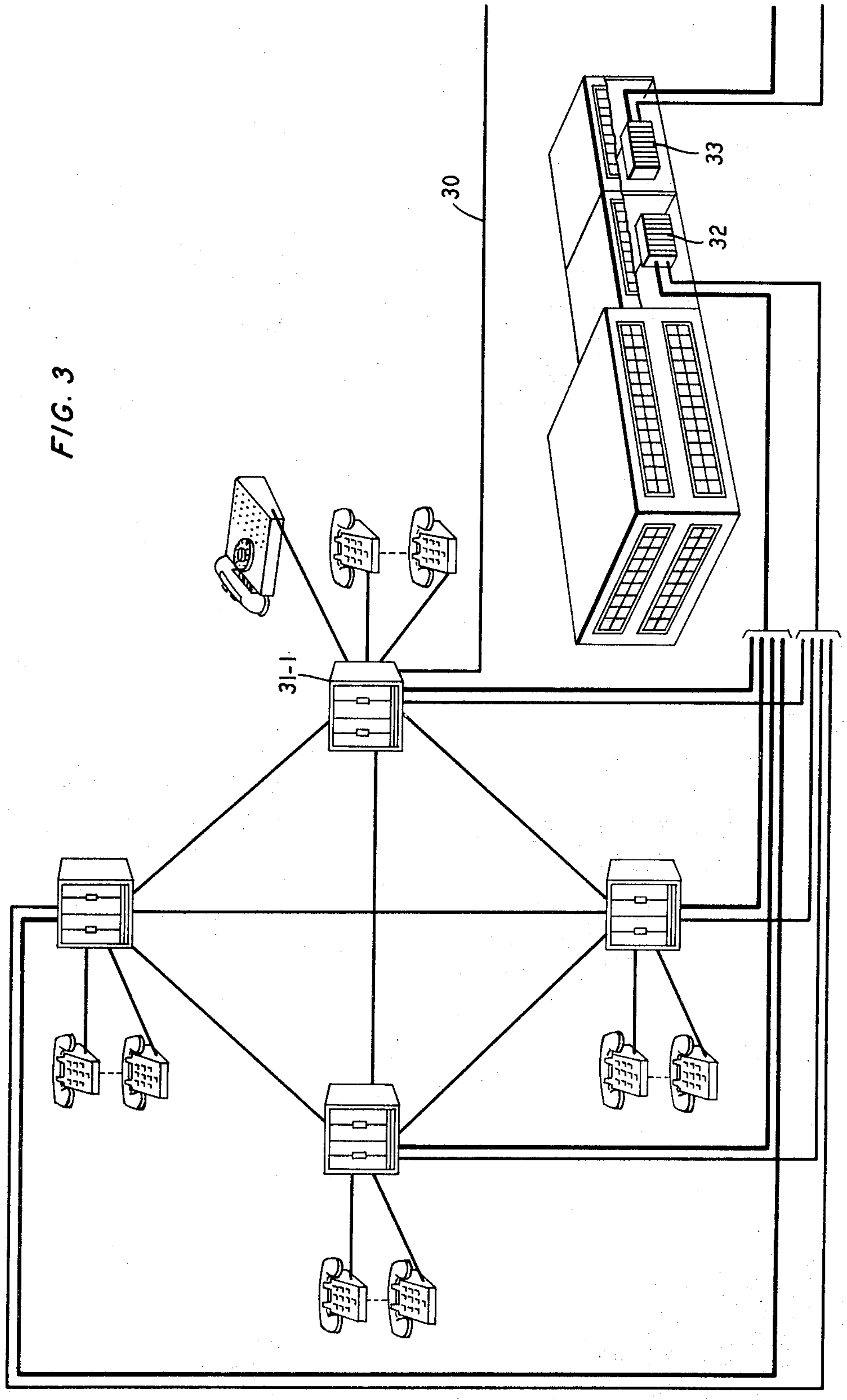
Figure 5:
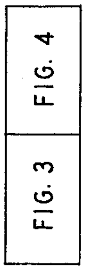
Figure 4:
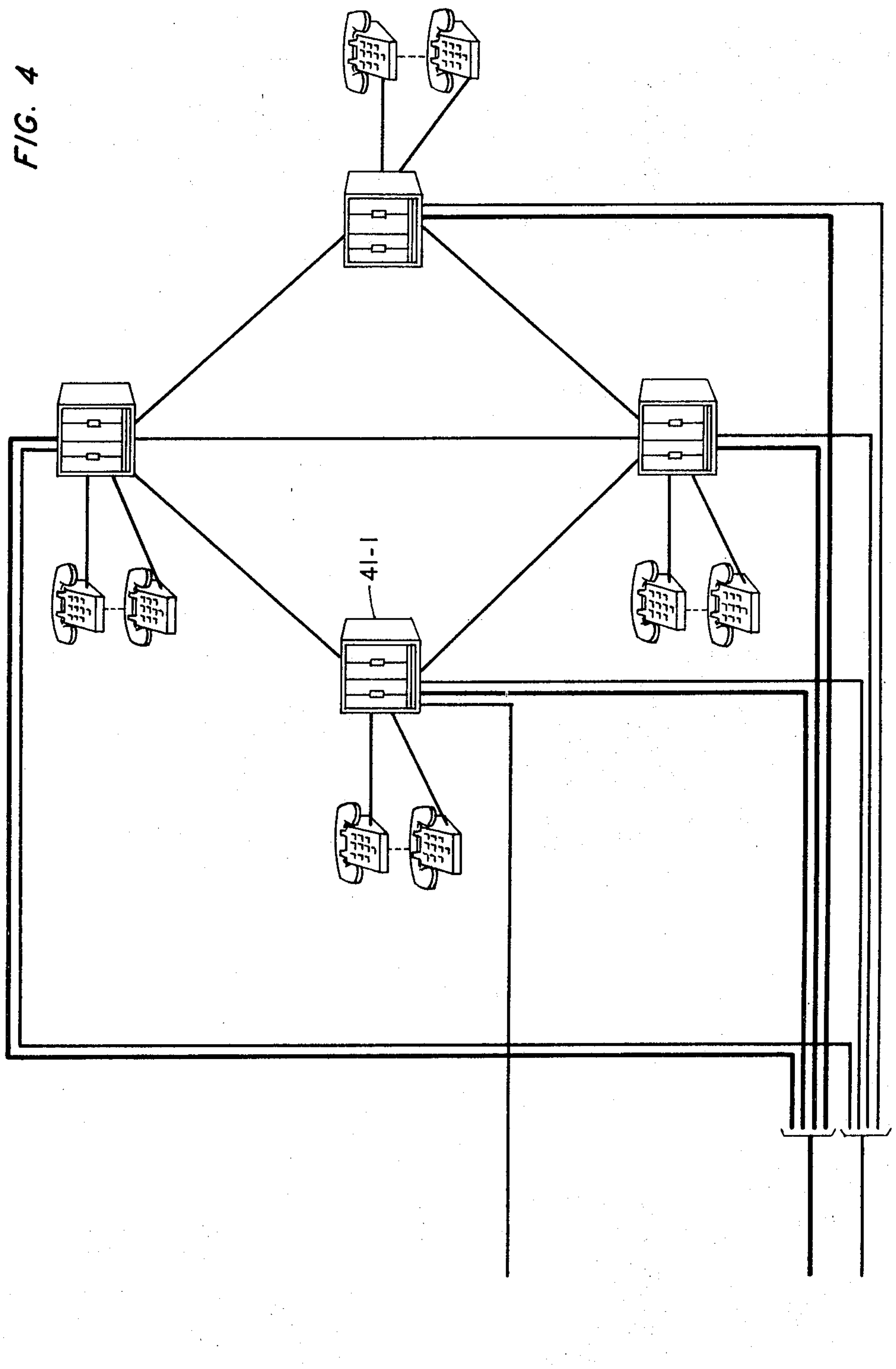
Figure 6:
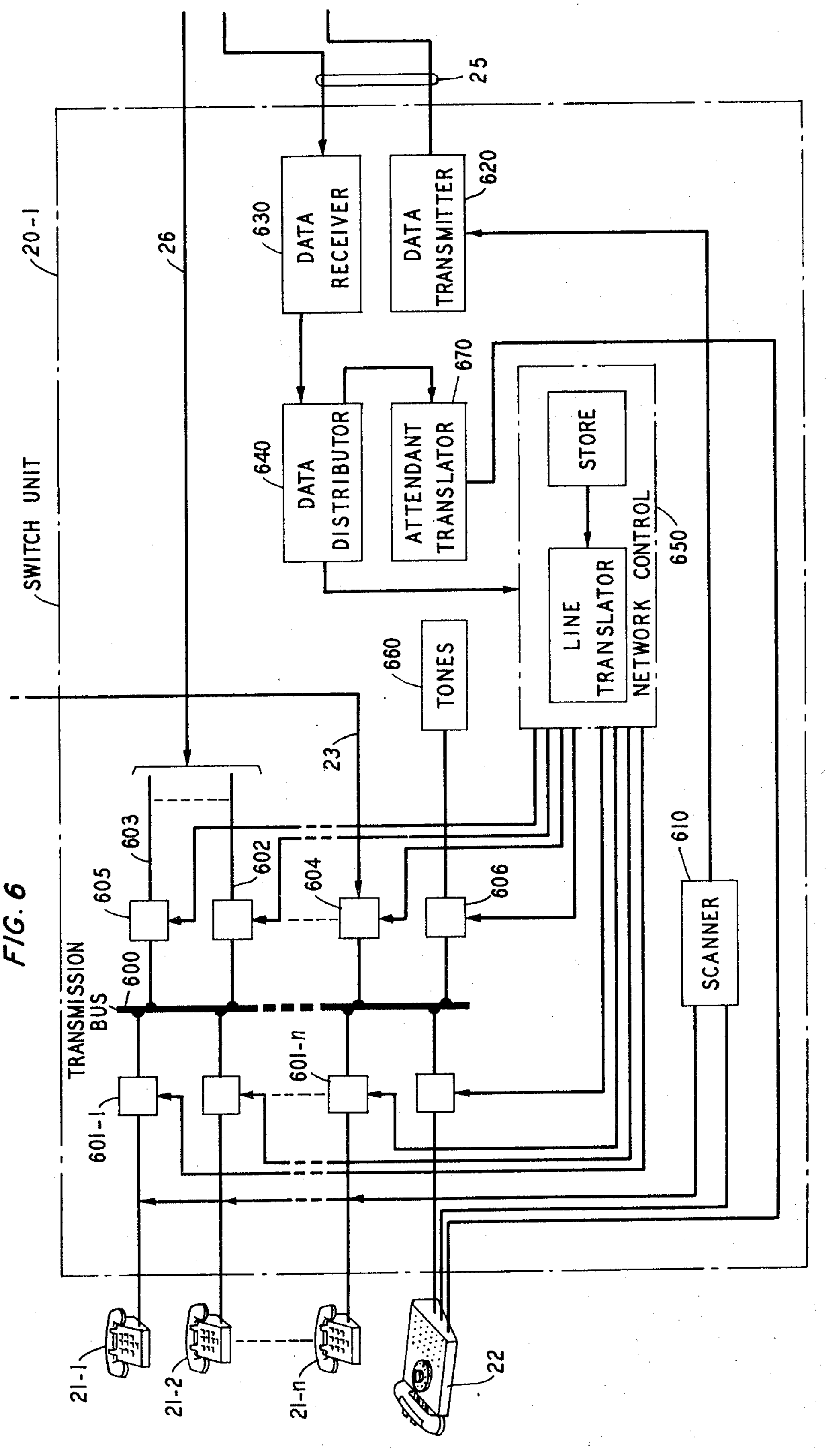
Figures 7, 8:
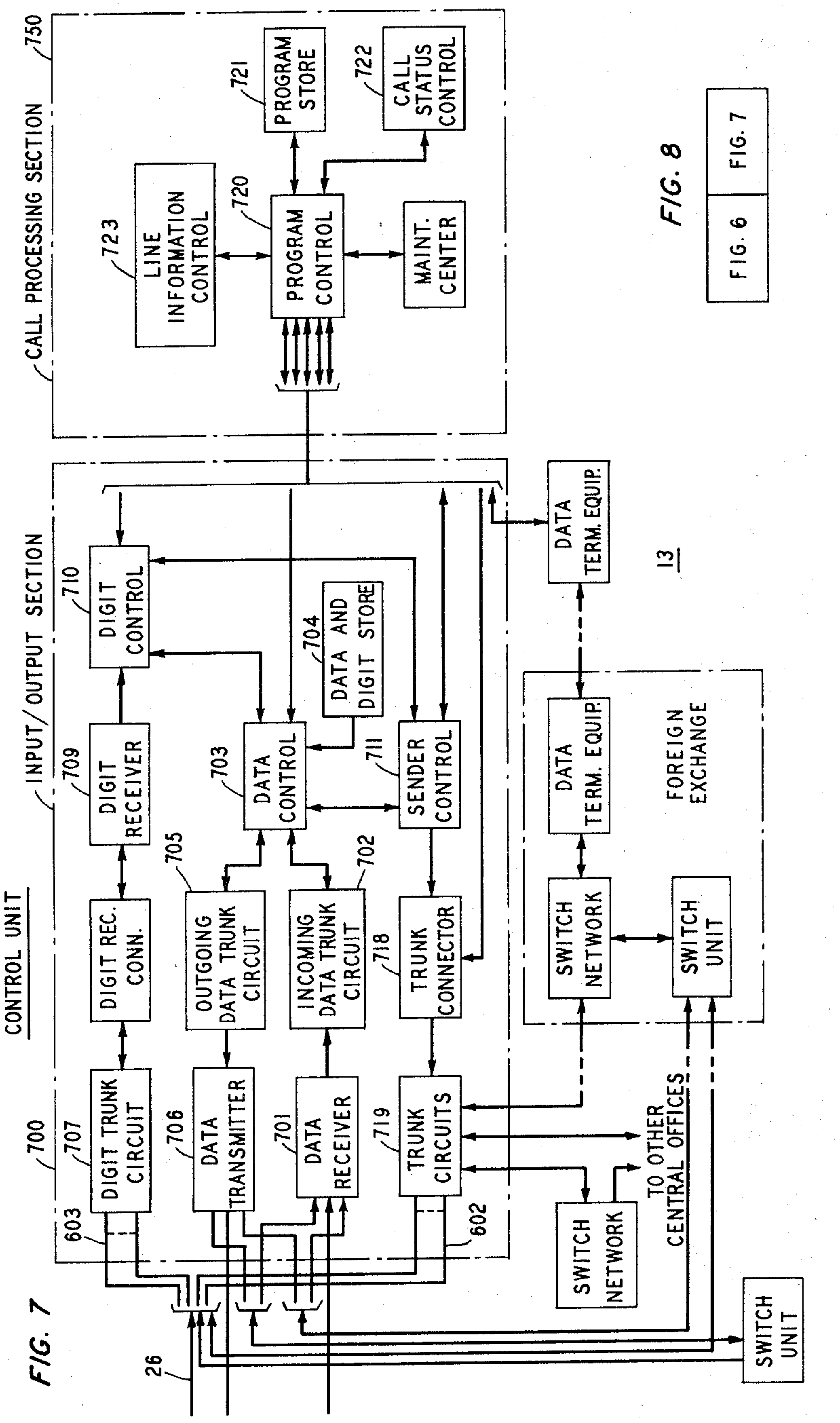
Figure 9:
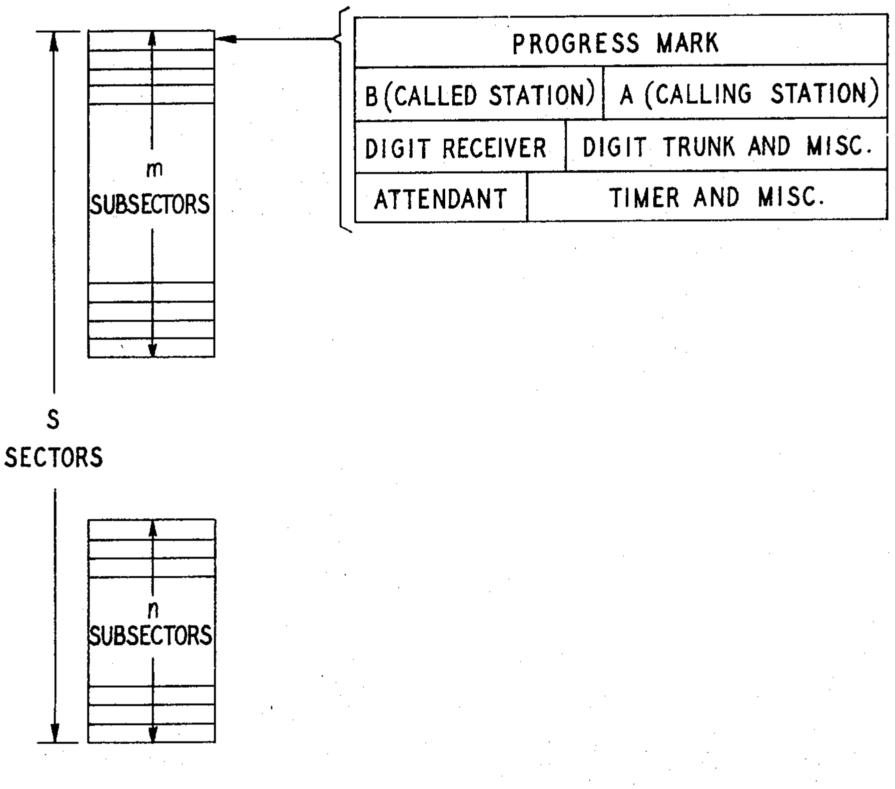
Figure 10:
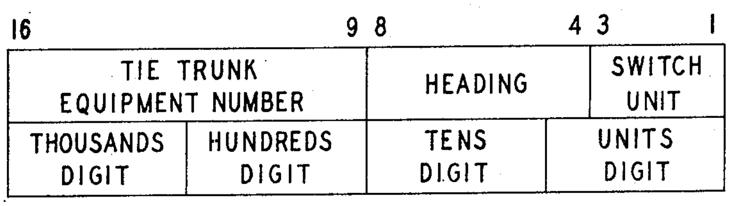
Figure 11:
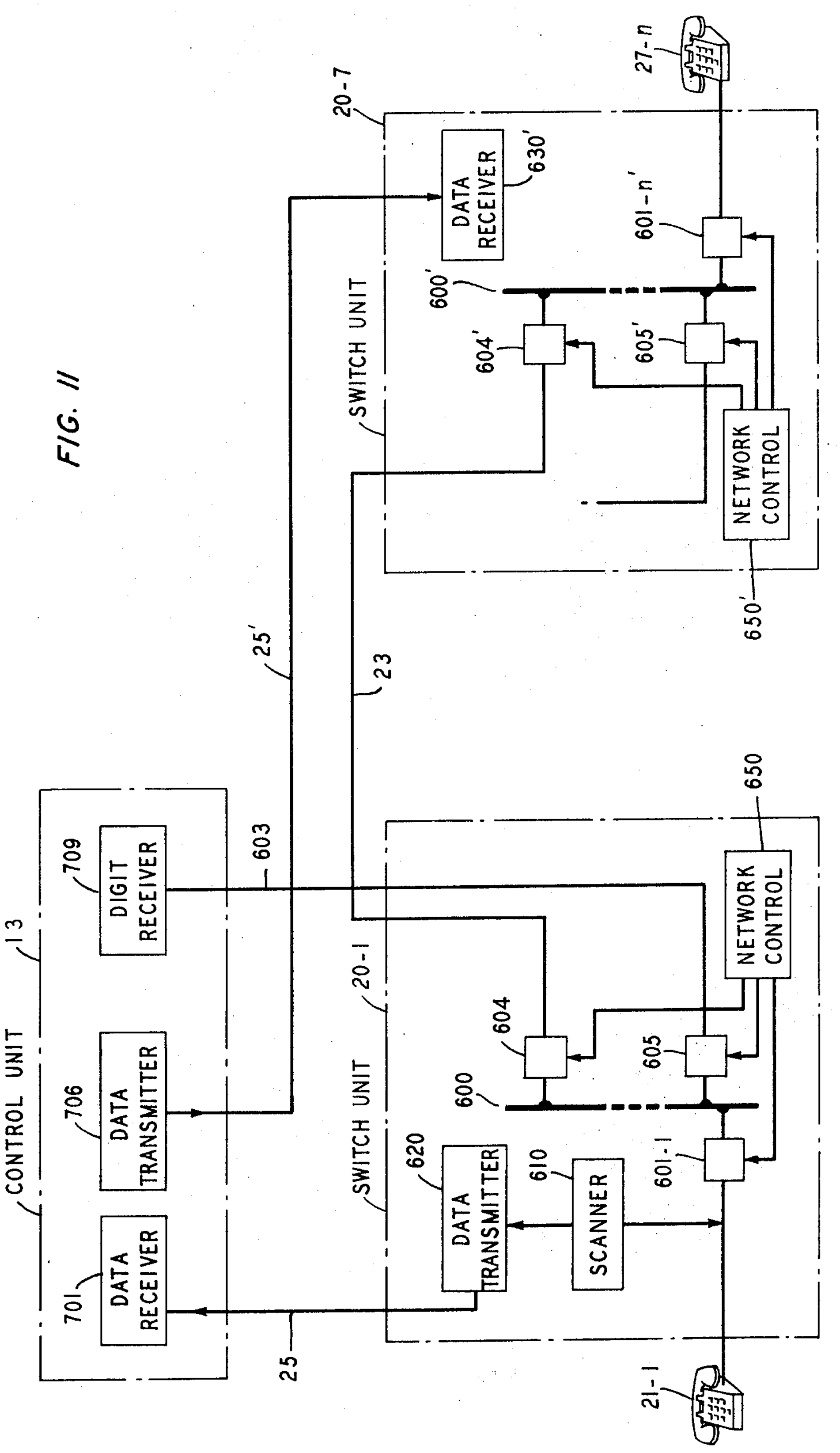

FIGS. 3 and 4 present a similar arrangement of switch units indicating the manner of interconnection of two main satellite groups in accordance with this invention;

FIG. 5 is a key chart for assembling FIGS. 3 and 4;

FIG. 6 depicts the principal characteristics of one PBX switch unit contained in the system illustrated in FIG. 1;

FIG. 7 depicts the principal characteristics of the PBX control unit contained in the system illustrated in FIG. 1;

FIG. 8 is a key chart for assembling FIGS. 6 and 7;

FIGS. 9 and 10 depict the content of various memory units contained in the control facility; and FIG. 11 depicts a particular type of station interconnection among switch units in the system illustrated in FIGS. 2–4.

The communication system depicted in FIG. 1 comprises a local telephone exchange which provides the normal telephone services to a distinct geographical area and is connected to other exchanges via trunks. The exchange area contains a central office 11 which serves telephone lines and trunks through central switching facilities 12.

In addition to regular telephone service, the system depicted in FIG. 1 is also arranged to serve a number of private branch exchanges particularly designed to provide service to business customers. In order to satisfy current demand for such service, it is desirable to provide equipment on the customer's premises of minimum size and requiring a minimum of maintenance. For this reason electronic equipment has been devised which permits the installation on the customer's premises to contain only the switching portion of the PBX with the control portion being located at the central office and arranged to serve a plurality of remote switch units. Thus in FIG. 1, three private branch exchange switch units are depicted, the control unit 13 being located at central office 11 and the switch units 10–1, 10–2 and 10–*n* being located on the respective customer's premises.

Each switch unit serves a plurality of extension telephone stations, such as stations 15–1 through 15–*n* served by switch unit 10–1. An attendant console, such as console 16 at switch unit 10–1, is available at each switch unit to accommodate unusual service requests. All requests for service are communicated through the switch unit on the customer's premises to control unit 13 at central office 11 via data links, such as link 18 joining switch unit 10–1 to control unit 13. All call connections involving PBX stations such as 15–1 and 15–*n* are completed to the outside world through the corresponding switch unit 10–1 and control unit 13 via digit, central office and tie trunks 19. This includes inter-PBX calls as well as foreign exchange calls.

Each switch unit is restricted to serving a maximum number of lines, the limitation being dictated by the internal time division operation, as noted hereinafter with regard to FIG. 6, and not by the parameters of control unit 13. A typical prior art switch unit of the type shown in R. C. Gebhardt et al. U.S. Pat. No. 3,225,144 granted Dec. 21, 1965, accommodates a maximum of 24 simultaneous conversations. The upper limit, as established by traffic requirements of the customer, might be in the neighborhood of 100 extension lines. If a customer's requirements grow beyond the maximum allowable number of extension lines permitted by one switch unit, a second switch unit would be required on his premises which, in turn, would require separate attendant facilities for the new group of stations and additional trunks to the control unit 13 for intraswitch unit calls as well as calls to the other exchanges. Thus a distinct tie-trunk from each switch unit to the control unit is required to complete intraswitch unit calls on the same customer's premises. I have found that this situation may be obviated in accordance with my invention by the provision of a Main-Satellite arrangement for each PBX customer.

Main-Satellite Exchange (FIGS. 2–4)

The Main-Satellite configuration in accordance with one illustrative embodiment of the invention is depicted in FIG. 2. As noted therein, the arrangement comprises seven satellite switch units 20–1 through 20–7, each serving a plurality of the same customer's stations, such as stations 21–1 through 21–*n*. However only one of the switch units, 21–1, provides attendant facilities 22 which serve all switch units. An integrated dialing plan exists for the whole exchange so that a station terminated on any switch unit can dial the digits representing any station in the exchange. For this purpose direct transmission links; e.g., tie-trunk 23, are connected directly between each pair of switch units. Call connections are established via data and digit trunks 25 and 26 to control unit 13, as before, but the talking paths themselves, viz, the tie-trunks such as trunk 23, are completely isolated from control unit 13.

An alternative arrangement, depicted in FIGS. 3 and 4, relies on alternate or tandem routes to accommodate interconnections among switch units which have no direct tie-trunks. Thus tie-trunk 30 between switch units 31–1 and 41–1 is utilized to complete connections between any switch unit served by control unit 32 and any switch unit served by control unit 33. This arrangement presents distinct advantages in systems which grow beyond the capacity of a single control unit. Thus control units 32 and 33 serve distinct groups of switch units, and intergroup calls are completed only via tie-trunk 30 interconnecting switch units 31–1 and 41–1 which serve, in this instance, as tandem switch units for lines terminating on other switch units in the two groups. Again, an attendant facility need only be located at one switch unit, in this instance switch unit 31–1.

Switch Unit (FIG. 6)

For all practical purposes the switch units on the customer's premises are identical. Thus switch unit 20–1, illustrated in detail in FIG. 2, represents the composition of any one of the switch units depicted in FIGS. 1–4. Switch unit 20–1 is essentially as described in detail in the aforementioned R. C. Gebhardt et al. patent, but for purposes of understanding the overall system operation, a brief description of the switch unit is provided.

The switch unit employs time division switching which is based on the principle that periodic samples of an information signal are sufficient to completely define the signal and that such samples, gleaned from a multitude of signal sources, may be transmitted in a regular sequence over a timed shared common path. Thus telephone stations 21–1 through 21–*n* are selectively connected to a common transmission bus 600 through corresponding line gates 601–1 through 601–*n*, which gates are sampled on a selective basis for a predetermined time interval in a recurrent cycle of time intervals.

If a pair of gates is closed simultaneously for the prescribed time interval, a sample of the information available at each of the connected stations will be transferred to the other station via common transmission bus 600. Thus a bilateral connection is established which, although physically connected for only a small fraction of the time, appears to be continuously connected because of the smoothing action of filters in each line circuit.

Switch unit 20–1 informs control unit 13 via data link 25 of all changes in the supervisory status of telephone lines, trunks and attendant console keys, e.g., whether they are idle (on-hook) or busy (off-hook). Control unit 13 then performs all of the decision-making tasks of call processing.

Interconnections (FIGS. 2 and 3)

Switch units 20–1 through 20–*n* are each connected to control unit 13 by two types of transmission facilities. The first type is represented by trunks 23 and 26, the latter including central office trunks, such as trunk 602, which connect time division bus 600 at switch unit 20–1 to the outside world via trunk circuits 719 in control unit 13. Tie-trunks, such as trunk 23, connect switch unit 20–1 at gate 604 to other PBX switch units for voice transmission. Such connections are completed via control unit 13 in the prior art and directly in accordance with my invention. Trunks 26 also include digit trunks, such as 603, which provide a transmission path from a calling station to digit receivers, such as 709 in control unit 13 to register call signaling information other than switch-hook flashes. Digit signals are transmitted from a calling station via the corresponding time division bus, such as 600 in switch unit 20–1, and the corresponding digit trunk gate, such as gate 605, to the selected digit trunk 603.

The second type of transmission facility is the data link which comprises Send and Receive channels. Link 25 is illustrated, connecting switch unit 20–1 with control unit 13. The data Send channel is unidirectional, connecting the respective switch unit to control unit 13 for the purpose of transmitting data relating to changes in the supervisory status of stations associated with the switch unit to control unit 13. Similarly, the data Receive channel is unidirectional and serves to transmit control signals for the establishment and disestablishment of connections through the respective switch unit from control unit 13. The data Send channel originates in data transmitter 620 at switch unit 20–1, for example, and terminates in data receiver 701 included in the input-output section 700 of control unit 13. Similarly, the data Receive channel for switch unit 20–1 originates in data transmitter 706 at control unit 13 and terminates in data receiver 630 at switch unit 20–1.

Control Unit 13 (FIG. 7)

Control unit 13, which may be as described in the aforementioned Vigliante et al. patent, performs all of the logical functions required to process calls through each of the remote switch units 20–1 through 20–*n*. It may, for ease of description, be divided into two major sections, viz, input-output section 700, and call-processing section 750, the former comprising equipment which communicates directly with each of the switch units and central offices associated with control unit 13, while the latter performs the actual processing required to establish and supervise calls at the switch units.

The operation may be understood more fully upon consideration of a typical intra-PBX call. Assume telephone 21–1, FIG. 6, goes off-hook. This change of status is recognized by scanner 610 which in turn formulates a message containing the corresponding line number and the new supervisory state. This information is transmitted to control unit 13, FIG. 7, via data transmitter 620 and the Send leg of data link 25.

Control unit 13, recognizing that there is no current call established which involves this particular line determines that the off-hook indication is a request for service and proceeds to set up a dialing connection. For this purpose a message is sent to switch unit 20–1 via the Receive leg of data link 25, specifying that telephone 21–1 be connected to a preselected digit trunk 603. This message is received by data receiver 630 and is transferred to network control 650 via data distributor 640. Network control 650, in turn, stores this message and translates it into an order to enable digit trunk gate 605 periodically to effect connection of station 21–1 to digit trunk 603 in a predetermined, recurring time interval. At the same time control unit 13 proceeds to connect digit trunk circuit 707 to a digit receiver 709 so as to transmit dial tone via digit trunk 603 to telephone 21–1.

Telephone 21–1 now proceeds to dial or otherwise transmit the digits representing the called telephone. Upon completion of dialing, control unit 13 sends a message to switch unit 20–1 which removes the connection to digit trunk 603 and establishes instead a ringing connection to the called telephone 21–*n* with audible ringing returned to telephone 21–1 by tones 660 via gate 606. When the called party at station 21–*n* answers, an off-hook message is sent via data trunk 25 to control unit 13 which returns a message to switch unit 20–1 to terminate ringing and to establish a talking connection via bus 600 upon the simultaneous and cyclic enablement of line gates 601–1 and 601–*n*.

All changes in supervisory states result in a data message being transmitted from scanner 610 in remote switch unit 20–1 to control unit 13 and an answering message from control unit 13 being received in switch unit 20–1 over data link 25. The latter message is utilized by network control 650 to establish the appropriate connections in a predetermined time slot in each cycle of time slots. The content of the received message also determines its distribution in switch unit 20–1, either to network control 650 or through attendant translator 670 to attendant console 22.

Input-Output Section 700 (FIG. 7)

Input-output section 700 of control unit 13 is arranged to handle three types of information. Incoming data is received in data receiver 701 and transferred to data and digit store 704 via an incoming data trunk 702 and data control 703. Outgoing data is taken from data and digit store 704 and transmitted to switch unit 20–1 via data control 703, an outgoing data trunk circuit 705 and data transmitter 706 or to the central office via sender control 711, trunk connector 718 and trunk circuits 719. Call destination information, such as dial pulses, is stored in data and digit store 704 under control of digit control 710. The third type of information comprises commands from the call processing section 750 which are utilized for supervision of the trunks connecting the various switch units to each other or to central offices with provision for the outpulsing of line designation digits over these outgoing trunks. Thus data and digit store 704 is required to store all data received from each switch unit and from call processing section 750 and to retain incoming and outgoing digits designating calling lines.

Call Processing Section (FIG. 7)

Whereas input-output section 700 is arranged to monitor active and prospective calls in each of the switch units 20–1 through 20–*n* concurrently, call processing section 750, FIG. 7, processes a single call at a time. Processing of any one call involves a number of steps as the connection is being established and disestablished. Call processing section 750 maintains a record of each of these steps in the processing of a call, thus keeping itself currently advised as to the status of every call in the system.

The status of each call is observed periodically and compared with information received from input-output section 700 and the data terminal equipment depicted in FIG. 4, so as to maintain a current status record for each call, the recorded status being updated upon receipt of each new condition report as the temporary record is observed. Such call status records are maintained in call status control 722, one of the three major units in the call processing section.

A second major unit is program control 720. The record of each call maintained in call status control 722 contains a distinct indication as to the current state of a call indicative of the progress made to data in the establishment of the connection. As the status of each call is observed, this call status indication or progress mark is transmitted to program control 720 where it is utilized to address a storage unit designated program store 721. Such action triggers program store 721 to provide a chain of commands to equipment throughout call processing section 750 which eventually serves to update the information contained in call status control 722. Line information control 723 contains information concerning each trunk terminating on control unit 13, auxiliary matters such as class of service to which a particular customer is entitled, abbreviated directory numbers, toll call diversion, compressed outpulsing translations, et cetera. Such information is available upon request by program control 720 as desired in the processing of a particular call.

Call processing section 750 systematically interrogates input-output section 700 for new information concerning a particular call that it is currently processing, such information including on- or off-hook messages, digit pulsing completed, et cetera. Following the instructions contained in program store 721, call processing section 750 interprets data received from the switch unit originating the particular call being processed, as temporarily stored in input-output section 700, and subsequently informs the same switch unit via input-output section 700 as to which connections to establish or disestablish in order to satisfy any change of status in the instant call. The call processing operation thus may be seen to comprise collecting information from the switch units, comparing such information with the current recorded status of a call, and advising the switch units to take appropriate action while updating the status of the call, each operation being under the control of instructions received from a stored program.

Call Status Control (FIG. 7)

In order to understand the unique contribution to this system operation of my invention, it will also be of assistance to examine briefly the arrangement and operation of the storage facility in call status control 722. The information is arranged in the store in such a manner, FIG. 9, that the status of each call may be observed in sequence in a recurring cycle. To facilitate such observation, a distinct portion of the store is allotted to each of the remote switch units depending upon traffic requirements. Each such portion or sector, in turn, is subdivided into subsectors of four words each, there being a four-word subsector corresponding to each time slot in a particular switch unit. Such four-word subsectors serve to record all of the information required to indicate the current status of a call. Included in each subsector is the progress mark which indicates this current status to the program control, thus governing the subsequent call processing operations. Also included are the identities of the calling and called stations, if known, the digit receiver and trunk assigned to the call, if any, plus miscellaneous control information involving the services of an attendant at the switch unit and various timing operations.

Generally the operation is as follows: A progress mark is read from a particular subsector of the store and transmitted to program control 720 where it initiates a distinct stored program sequence for processing the call. If this sequence is of such a nature as to change the status of the call, appropriate information is added to or deleted from the corresponding subsector of the store, and a new progress mark is inserted. Upon completing the interrogation of a particular subsector, the progress mark contained in the next subsector is read and the sequence repeated. After all subsectors have been investigated in sequence, the cycle is repeated.

In addition, distinct program routines are available, one being initiated at the beginning of each sector and another at the end of each sector. Thus, as a particular sector of the store, corresponding to a particular switch unit, is reached in the sequence, the beginning of sector scan routine is initiated. It interrogates data control 703 in the input-output section 700 for new input data from the corresponding switch unit, such as a line changing from the idle to the active state. It retrieves such originating messages from data and digit store 704, classifying the messages as pertaining to extensions, trunks, attendants, or maintenance facilities. During the ensuing sector scan, the new input message is compared with active numbers which are recorded in the call status subsectors. At the same time all active calls recorded in the subsectors are updated as required.

Upon completion of the sector scan, the special end of sector scan routine is initiated to determine whether or not a match was obtained between the new information and the previously recorded information. If no match is indicated, a new request for service is assumed. The end of sector scan routine is then responsible for the location of an idle time slot for use by this call, an idle digit trunk 707 to the originating switch unit, and an idle digit receiver 709. It thereupon serves to interconnect the assigned digit receiver and digit trunk in the input-output section 700. In addition, it records in the subsector corresponding to the selected time slot the numbers indicative of the calling line, the assigned digit trunk and the assigned digit receiver. Finally, it provides for the placement of the appropriate progress mark in the assigned subsector.

Call status control 722, in accordance with my invention, also stores messages of the type depicted in FIG. 10 in a main-satellite buffer store. Each of these messages contains two words of 32 bits each which suffice to satisfy the requirements of all messages required in the various system operations. In the first word, bits 1–3 define the switch unit for which the message is intended, bits 4–8 define the purpose or heading of the message and bits 9–16 identify the tie-trunk to be utilized in an interswitch unit call. The content of the second word depends on the purpose defined in the first word. For an interswitch unit call, this word will contain the dialed digits designating the called station.

When a service request, detected during a first switch unit sector scan, requires connection through a second switch unit to reach the called station, such a message will be generated and stored until the second switch unit sector scan is initiated. At this time the message is utilized to permit action to continue in the second switch unit.

Station to Station Call (FIG. 11)

Assume first that station 21–1 at switch unit 20–1 is calling station **27–*n* at switch unit 20–7. The call begins under control of switch unit 20–1 and input-output section 700 as described earlier. When station 27–1 goes off-hook, scanner 610 in switch unit 20–1 recognizes the change of state and pauses in its scan long enough to transmit the station identity and its condition to a data receiver 701 in the input-output section 700 via data trunk 25. The receivers, including 701, are scanned by data control 703, and the incoming message is directed into data and digit store 704. Subsequently, call processing section 750 receives this message from store 704 and initiates a record of the call progress in call status control 722 by storing the designation of station 21–1 in the A (calling station) position (FIG. 9) of the subsector assigned to this call. An idle digit trunk 603 and digit receiver 709 are selected, and a message is sent to switch unit 20–1 via data trunk 25 resulting in calling station 21–1 being connected to digit trunk 603 via bus 600 when network control 650 enables gates 601–1 and 604 simultaneously. At this point the calling party receives dial tone generated at digit receiver 709 and transmitted through digit trunk 603. Station 21–1 now proceeds to dial station 27–*n***.

During receipt of digits identifying the called station **27–*n*, call status control 722 continually scans the storage sectors, FIG. 9. Assuming that a four-digit number identifies each PBX station, the thousands and hundreds digits are used to identify the called switch unit 20–7. This number first is compared with the preregistered identity of switch unit 20–1, a match of course indicating a called station in the same switch unit. In this instance a match is not obtained and the called switch unit identity is used to access a table storing identities of tie-trunks terminating on switch unit 20–7. If switch units 20–1 and 20–7** are not interconnected by tie-trunks, the program is arranged to retrieve the designation of an alternate switch unit which has tie-trunks to both calling and called switch units and thus can act as the tandem for this call.

When the identity of idle tie-trunk 23 has been located, the message in the FIG. 10 format is transferred to the allotted area of the main-satellite buffer store. This message is detected by the program prior to the switch unit 20–7 sector scan. During the beginning of sector scan, it is determined that switch unit 20–7 is part of a main-satellite complex, and the buffer store is accessed for messages pertaining to this switch unit. Since the tie-trunk message is present in this instance, it is now determined that an idle time slot is present in switch unit 20–7. If none exists, switch unit 20–1 on the other end of tie-trunk 23 is located and provided with a busy tone. If an idle time slot in switch unit 20–7 is located, the tie-trunk identity is placed in the A (calling station) portion of the assigned subsector of switch unit 20–7, FIG. 9. Also, the called station identity, when available in the second message word, is placed in a special storage area containing a list of numbers awaiting busy test.

If idle, the called station designation is placed in the B (called station) portion of the subsector assigned to this call in the sector for switch unit 20–7. Also, the tie-trunk designation is placed in the B (called station) portion of the subsector assigned to this call in the sector for switch unit 20–1. The program now commands switch unit 20–1 via the corresponding data link 25 to break the digit trunk connection previously established. Also, the called station **27–*n* is connected to ringing tone via data trunk 25' to switch unit 20–7, and the calling station 21–1 is connected to ringback tone via data trunk 25 to switch unit 20–1. Upon answer by station 27–*n*, a message will be sent to switch units 20–1 and 20–7 which causes their connection to tie-trunk 23 during the assigned time slot. The call now proceeds with tie-trunk 23 transmitting the speech signals directly between switch units 20–1 and 20–7 via a path including gate 601–1, bus 600, gate 604, trunk 23, gate 604', bus 600' and gate 601–*n'***.

Upon disconnect, the procedure followed in taking down the connection is complicated by the fact that in order to avoid double connections the tie-trunk cannot be released for other service until both stations are back on-hook. Nevertheless it is desirable to mark the tie-trunk idle as quickly as possible to assure maximum availability. Assume then that station **27–*n* goes on-hook first and switch unit 20–7 reports this condition to control unit 13. The program determines from this message that tie-trunk 23 should be idled and generates a message for this purpose in the main-satellite buffer store. At the same time, switch unit 20–7 is advised via data trunk 25' to take down the connection of station 27–*n* to tie-trunk 23. When the sector scan for switch unit 20–1 detects this message, it is instructed to wait for a report from switch unit 20–7 that station 21–1 has gone on-hook. When this occurs tie-trunk 23 is marked idle in control unit 13, and switch unit 20–1 is advised via data trunk 25** to take down its end of the connection.

What is claimed is:

1. A communication system comprising a plurality of lines, a plurality of switch units, each having means for independently completing connections among a distinct group of said lines terminating on the corresponding switch unit, a control unit common to and remote from said plurality of switch units for recording the status of all calls through the system and for directing the interconnection of lines through said switch units and means for completing a talking connection between a calling line terminating on a first one of said switch units and a called line terminating on a second one of said switch units comprising transmission means directly interconnecting and terminated only on said first and second switch units.

2. A communication system in accordance with claim 1 wherein said control unit comprises means for receiving the request for service from said first switch unit, means for selecting said transmission means, means for notifying said first switch unit to connect said calling line to one end of said transmission means at said first switch unit and means for notifying said second switch unit to connect said called line to the other end of said transmission means at said second switch unit.

3. A communication system in accordance with claim 1 wherein said control unit comprises means for generating a message indicating the distinct transmission means assigned to a particular talking connection and means for transmitting said message to said second switch unit.

4. A communication system in accordance with claim 1 wherein said first switch unit has no direct connection to a third one of said switch units, and further comprising means for completing a talking connection between said calling line and a called line terminating on said third switch unit comprising said transmission means between said first and second switch units and transmission means directly interconnecting and terminated only on said second and third switch units.

5. A communication system in accordance with claim 4 wherein said control unit comprises means for receiving the request for service from said first switch unit, means for selecting said transmission means between said first and second switch units and between said second and third switch units, means for notifying said first switch unit to connect said calling line to one end of said transmission means at said first switch unit, means for notifying said third switch unit to connect said called line to one end of said transmission means at said third switch unit and means for notifying said second switch unit to interconnect said transmission means to complete the call connection.

6. A telephone system comprising a plurality of independent private branch exchange switch units, each terminating a distinct group of telephone lines, a control unit common to a first group of said plurality of switch units for performing the majority of the control functions necessary to the interconnection of calling and called lines through the switching networks of said switch units and tie-trunks interconnecting said switch units independently of said control unit, said control unit comprising means responsive to a service request from one of said switch units for establishing a talking connection to another one of said switch units via one of said tie-trunks.

7. A telephone system in accordance with claim 6 wherein said control unit means comprises means for storing a message including the identity of said one of said tie-trunks and the identity of the called line and means for transmitting said message to the switch unit terminating the called line.

8. A telephone system in accordance with claim 6 and further comprising a second control unit serving a second distinct group of said switch units, said first and second groups of switch units being connected for intelligence transmission by tie-trunks interconnecting only one of said switch units in each of said groups.

9. A telephone system in accordance with claim 6 wherein said means responsive to a service request from one of said switch units includes a memory having portions for each switch unit and means responsive to said service request from said one switch unit for storing a message in the portion of said memory for said another of said switch units.

10. A communication system comprising a plurality of independent switch units, each terminating a distinct plurality of lines, a central office having access to said remote switch units and to foreign exchanges and a control unit common to and located remote from said plurality of switch units for recording the status of all calls through the system and for directing the interconnection of lines through said switch units, said control unit comprising means responsive to the dialing of a predetermined number of digits for interconnecting a pair of said lines terminating on one of said remote switch units, means responsive to the dialing of a number of digits in addition to said predetermined number of digits for connecting one of said lines through said central office to a foreign exchange, and means responsive to the dialing of only said predetermined number of digits for interconnecting lines terminating on different ones of said remote switch units via transmission links directly interconnecting and terminated only on said switch units.

* * * * *